United States Patent
Penna et al.

(10) Patent No.: US 8,035,617 B2
(45) Date of Patent: Oct. 11, 2011

(54) PORTABLE COMPUTER DEVICE

(75) Inventors: David E. Penna, Redhill (GB); Richard M. Miller-Smith, Lingfield (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1156 days.

(21) Appl. No.: 10/528,950

(22) PCT Filed: Sep. 12, 2003

(86) PCT No.: PCT/IB03/03975
§ 371 (c)(1),
(2), (4) Date: Mar. 23, 2005

(87) PCT Pub. No.: WO2004/029787
PCT Pub. Date: Apr. 8, 2004

(65) Prior Publication Data
US 2006/0103622 A1    May 18, 2006

(30) Foreign Application Priority Data
Sep. 28, 2002 (GB) .................................. 0222557.1

(51) Int. Cl.
*G09G 5/00* (2006.01)
(52) U.S. Cl. ........................................ 345/169; 345/156
(58) Field of Classification Search .................. 345/156, 345/204, 530, 169
See application file for complete search history.

(56) References Cited

U.S. PATENT DOCUMENTS

| | | | | |
|---|---|---|---|---|
| 6,321,158 | B1* | 11/2001 | DeLorme et al. | 701/201 |
| 6,437,797 | B1* | 8/2002 | Ota | 345/638 |
| 6,778,195 | B2* | 8/2004 | Venolia | 715/856 |
| 6,801,777 | B2* | 10/2004 | Rusch | 455/452.2 |
| 7,027,073 | B2* | 4/2006 | Bodin et al. | 345/629 |
| 7,116,325 | B2* | 10/2006 | Asami | 345/419 |
| 7,423,771 | B2* | 9/2008 | Ohata et al. | 358/1.15 |
| 7,720,596 | B2* | 5/2010 | Kobuya et al. | 701/200 |
| 7,809,501 | B2* | 10/2010 | Listle et al. | 701/208 |
| 2001/0030667 | A1* | 10/2001 | Kelts | 345/854 |
| 2002/0030667 | A1* | 3/2002 | Hinckley et al. | 345/173 |
| 2002/0080151 | A1* | 6/2002 | Venolia | 345/660 |
| 2002/0154150 | A1* | 10/2002 | Ogaki et al. | 345/684 |
| 2004/0123320 | A1* | 6/2004 | Daily et al. | 725/61 |

FOREIGN PATENT DOCUMENTS

| EP | 0637807 A1 | 2/1995 |
|---|---|---|
| EP | 0637807 B1 | 2/1995 |

* cited by examiner

*Primary Examiner* — Bipin Shalwala
*Assistant Examiner* — Afroza Chowdhury

(57) ABSTRACT

A portable computer device has data acceptance logic (24,40) that determines whether input data items have time and location information. If not, data items are stored together with time and location information taken from clock (30) and location determining circuitry (28), here a Global Positioning Service (GPS) system. A screen (6) is arranged to display data items in a time mode or a space mode. In the time mode, those data items with time information in a time interval are displayed on a time line. In a space mode, data items with time information in a display area are displayed, for example on a map of the display area. The display can be toggled between the time and space modes.

12 Claims, 2 Drawing Sheets

PORTABLE COMPUTER DEVICE

The invention relates to a portable computer device, particularly but not exclusively to the type of portable computer device known as a personal digital assistant (PDA), as well as to a method of operation.

PDAs are quite widely available, and generally offer a number of computing services in a portable format. Generally, the screen is very roughly of order 10 cm across, and a number of services are offered including for example a calendar, a diary, and an address book, together in some cases with further services more commonly available on larger computers such as word processing or a spreadsheet.

However, it would be beneficial to provide greater functionality and increased integration in portable computer devices such as PDAs.

According to the invention there is provided a portable computer device including a data input; a control input; data acceptance logic arranged to accept data on the data input, to determine whether time and location information is present, to add time and/or location information to data items not having time and/or location information respectively and to store data items in memory together with respective time and location information; a display arrangement arranged to cause the display of data items, including data items stored in the memory, in one of a plurality of modes, the modes including a time mode and a space mode, the display arrangement being arranged: to switch between the time and space modes in response to a corresponding input on the control input; to display in the time mode a representation of a time interval together with representations of those data items that have respective time information in the time interval, the representations of data items being displayed at locations corresponding to the respective time information; and to display in the space mode a representation of a display area together with representations of those data items that have respective location information within the display area, the representations of data items being displayed at locations corresponding to the respective location information.

A benefit of the portable computing device according to the invention is that it displays all data items according to intuitive time or space views.

It will be appreciated that many data items will be entered without the time or location information. However, the device is capable of determining the time and its location and storing this with the data item. For example, when data is input both the present time and the location information may be stored together with the image. Alternatively, the location information or time information of some data items may be set by the data item. For example, addresses of contacts may conveniently take as the location information the location of the address rather than the location of the portable computing device at the time the location information is input.

The time and location information may conveniently be stored as a tag recording the time information, location information and data type. These tags may be of predetermined format to allow easy exchange of data items between devices and hence allow ready exchange of data items suitable for use in the present invention.

A zoom control may preferably be provided. The device may then be arranged to accept input from the zoom control and to adjust the displayed time interval in the time mode and the displayed area in the space mode in accordance with the input on the zoom control. The zoom control allows adjustment of the displayed area or time interval—the portable computing device will not in general know whether a narrow or a broad view is required, so selecting the correct zoom setting will often require user input.

The display of data items may be using an icon corresponding to the data items. In some cases the icon may be taken from the data item itself. For example, for image or movie data items the icon may be a part or a whole of the image or movie.

Preferably, the portable computer device includes a screen; a memory for storing data items and time and location information corresponding to the data items; data exchange circuitry including a wireless interface for bi-directional communication; a location determining arrangement for obtaining location information and a clock for determining time information.

In an embodiment, each of these components is included within a common housing together with other components such as the zoom control and a central processing unit. However, other embodiments include some of these components within separate housings arranged to communicate with each other through a network, for example a personal area network or other local network.

The portable computing device gives access to a number of services through the data input, typically through a mobile telephony link, though the skilled person will be aware of many other types of network link that may alternatively or additionally be used.

The data acceptance logic may include code stored in memory arranged to cause a processor to accept data on the data input, to determine time and/or location information for data items input on the data input not having time and/or location information respectively and to store data items in memory together with respective time and location information. The data acceptance may also be carried out in hardware. Preferably, each data item entered or input or otherwise arriving at the portable computer device and stored for future display is stored together with time and location information. In alternative embodiments, predetermined classes of data are tested for missing time and/or location information.

Similarly, the display arrangement may include software for causing a dedicated graphics processor or a main processor to display on a screen data items in the time or space modes. The screen may be integral with the portable computer device, or alternatively provided as a separate component.

Preferred embodiments include a control for selecting data items wherein the device is arranged on selection of a data item to cause the display to be centred on the selected data item, and wherein on switching between time and location modes the selected data item remains displayed.

The device preferably includes a camera for recording image information.

The flexibility of a device according to the invention should allow such devices to greatly enhance the functionality of present PDAs.

The invention does not just relate to the portable computer device as set out above, but in another aspect the invention relates to a method of operation of a computer device having a display screen, the method including: accepting input data; testing whether input data includes time information and determining the time of any input data not including time information; testing whether input data includes location information and determining the computer device location as the location of any input data not including location information; recording input data as data items including both time information and location information; accepting an input to select a time or a space mode; in the time mode, displaying on a display screen representations of data items in a time interval on a time line according to the time information stored in the memory corresponding to the data items; and in the space mode, displaying on the display screen representations of data items on a display area according to the location information corresponding to the data items.

Preferably, the method includes accepting input on a zoom control and zooming the display to change the display area in the space mode and to change the time interval in the time mode wherein the data items are displayed together with information relating to the data items, the amount of information displayed for each data item varying with the zoom setting set by the zoom control. In this way the amount of information displayed may conveniently be varied without requiring a further control.

The method preferably further includes recording an image corresponding to a new event, storing the image as a data item together with the time and location information and displaying the image when displaying the data item.

In another aspect, the invention relates to a computer program product arranged to cause a computer to carry out the steps of a method as set out above. Conveniently, the computer program product may be recorded on a data carrier.

In a yet further aspect, the invention relates to a portable computer device comprising: a screen; a memory for storing data items and time and location information corresponding to the data items; data exchange circuitry including a wireless interface for bi-directional communication; a location determining arrangement for obtaining location information; a clock unit for determining time information; and code arranged: to determine time and/or location information for data items not having time and/or location information respectively and to store data items in the memory together with time and location information corresponding to the data items; to display data items in a time mode by displaying on the screen on a time line representations of those data items that have time information in a time interval according to the time information stored in the memory at locations along the time line corresponding to the time information; to display data items in a space mode by displaying on the screen on a representation of a display area those data that have location information within the display area according to the location information stored in the memory at locations corresponding to the location information; and to accept an input to switch between the time and space modes to display the data items in either the time or the space mode.

Embodiments of the invention will now be described, purely by way of example, with reference to the accompanying drawings in which.

Figure 1:
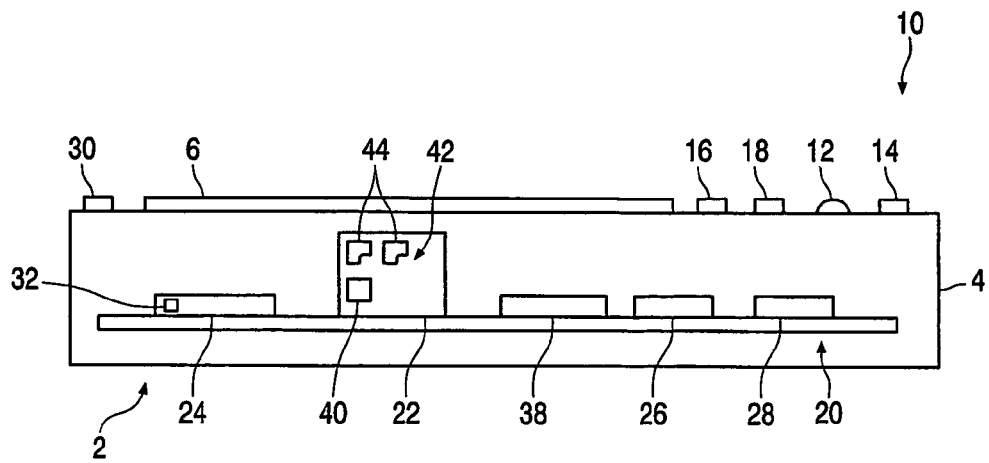
FIG. 1 shows a schematic of a PDA according to the invention.
Figure 3:
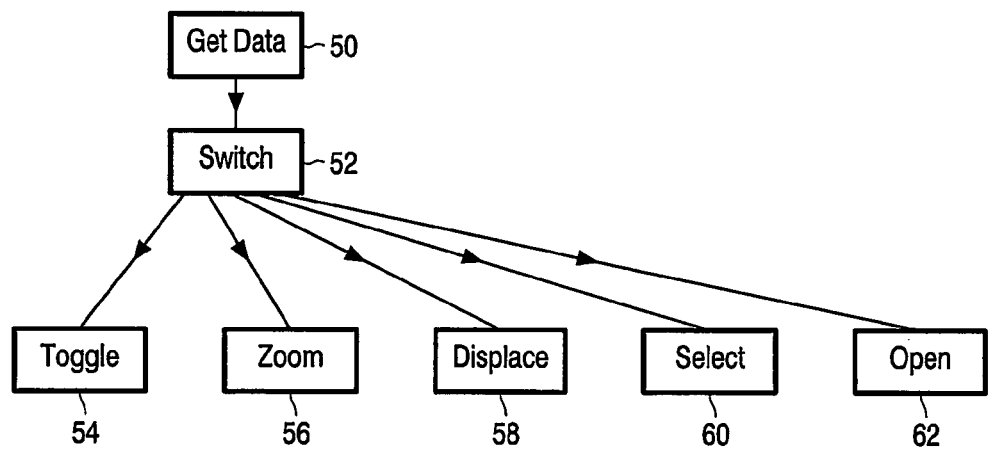
FIG. 3 shows a flow diagram of the operation of the PDA of FIG. 1 to display information.
Figure 4:
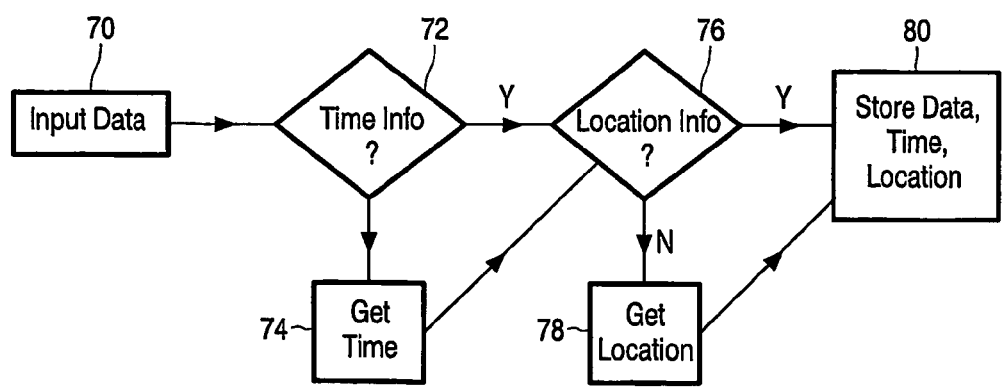
FIG. 4 shows a flow diagram of the data input process of the PDA of FIG. 1.

A PDA 2 has a housing 4 and a screen 6 mounted on the housing. The screen may be any type of screen suitable for displaying images—a display having 640 by 320 pixels of width about 12 cm is commercially available and is suitable, though the skilled person will be aware that many other types of display are available and may be used.

A number of controls 10 are also mounted on the housing. A tracker ball 12 is provided for scrolling and a zoom control 14 in the form of a roller is also provided on the housing. These two controls are dedicated to scrolling and zooming respectively since these will be common actions when using the device. A number of buttons 16 are also provided, one of the buttons being a selection button 18 for selecting a data item on the display.

The housing 4 contains electronic circuitry 20 having a memory 22, a central processing unit 24, a wireless interface 26, for example both a mobile telephony interface 26 and a wireless local area network (wireless LAN) interface 38. The wireless interface accordingly acts as a data input device.

Location determining circuitry 28 is also provided—in the example this uses the Global Positioning Service (GPS) but it will be appreciated that there are other ways of determining position, for example by using wireless beacons.

The circuitry also includes a camera 30 mounted on the outside of the housing for capturing images. A clock 32 is provided in the central processing unit 24.

All of these components and their alternatives are individually known to those skilled in the art and so will not be described further.

The memory 22 includes both code 40 for controlling the central processing unit and a database 42 storing data items 44. In the example the database is a relational database, but this is not essential. The term memory 22 includes both random access memory and also a hard drive storing bulk data. Other bulk storage devices such as compact flash memory may be provided as well as or instead of the hard drive.

Figure 2:
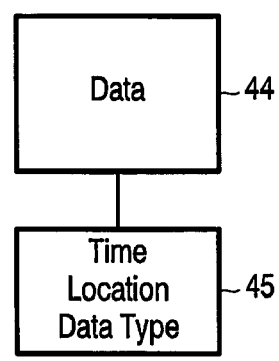
FIG. 2 illustrates a data item and tag.

The database 42 stores data items 44 together with a tag 45 (FIG. 2) indicating the location, place and type attached to the data items. Where no location or time is provided on inputting a data item, the clock 32 may be used to provide time information and the location determining circuitry 28 used to provide location information.

In use, the computer waits for an input (step 50) (i.e. a control input) and then determines in a switch step the action to take dependent on the input (step 52).

If the input, for example on a button 16, requires toggling between display modes, the display is switched (step 54). Such a control input may also be given in other ways, for example, by selecting a suitable control symbol using a pointer device on the screen.

In a time mode, the display displays a time line representing a time interval and any data items with time information within the time interval are displayed at locations along the time line corresponding to the time information. In the event that the time interval is large and there are too many data items to display then some of the data items may be suppressed.

The background to the display of the time mode preferably includes time information such as other information graphically representing day and night, temperature, season and day. For example, the background may be slightly darker in regions of the display representing night compared with regions of the display representing day.

In a location mode, the display displays a representation of an area, preferably in the form of a map or plan, as well as any data items 44 with location information within the area, according to the stored location information.

Thus, the display can be switched between time and location modes representing the data temporally and spatially.

When the switch step 52 detects operation of zoom control 14, control switches to step 56 to change the amount of time displayed in the time mode and the area in the location mode. This allows zooming in or out to get information displayed on the scale desired by the user. Preferably, the amount of information displayed for each data item can be changed by the zoom setting. Thus, by zooming in more information is displayed about each data item. For example, when zoomed out a phone call may be represented on the display by a simple icon. By zooming in, the display may automatically display the telephone number called and the duration of the call. In another example, a web session may again be represented by a simple icon when zoomed out, which may be replaced on zooming in by thumbnail images of each page accessed to allow the web pages accessed to be retrieved.

Input on tracker ball 12 causes step 52 to switch to step 58 to shift the display. In the time mode an input on tracker ball 12 moves the time interval forwards or backwards. Similarly, in the location mode, operation of the tracker ball shifts the displayed area.

An input provided on selection button 18 causes (step 60) a displayed data item to be selected. The data item selected may be the data item closest to the centre of the display, or closest to a movable pointer displayed on the screen. Toggling between time and location modes preferably enters the new mode with the selected data item in the centre of the display.

The data items may also be opened (step 62), for example by "double clicking" the selection button. The way the PDA handles the opened data item and displays will depend on the data item. For example, opening a photograph may simply cause the photograph to be displayed but opening a text document may cause a text editor to be opened. The skilled person will be familiar with many other types of data item and corresponding actions to be taken.

In one example, photographs taken may be laid out in an album, and combined with other data such as sound to provide an audio-visual display. The time and location information automatically recorded act as indexes to automatically index the information without any further user input.

It will be appreciated that displayed data items need location and time information to be indexed and displayed on the location and time displays. Therefore, when input data arrives at the device (step 70), for example by being downloaded on wireless interface 26, input through a keyboard or pointer device, or captured e.g. by camera 30, it is determined (step 72) whether the data includes time information. If not, the current time is determined (step 74). Likewise, it is determined (step 76) whether the data includes location information (step 78) and if not the current location is determined (step 80). The data is then stored (step 82) together with a tag recording time, date and data type information.

The invention provides a convenient integrated PDA that gives access to data and services and stores information in a readily retrievable format.

The PDA can access the full internet, not just a wireless application protocol subset, so provides access to a full range of services and information. The wireless interface preferably includes both a mobile telephony interface for access anywhere together with a wireless LAN interface for high bandwidth low-cost access in suitable locations.

The use of a tracker ball allows easy scrolling even on a screen sized to fit in a large pocket.

In the embodiment described, the software has a number of other functionalities. In particular, the software automatically gathers data, including both the position and time when data is recorded—other information may also be added. For example, the device may be fitted with a temperature sensor and temperature data too may be recorded.

The data format used with common tags allows easy exchange of data.

The benefits of the device may become clearer from an example.

Figure 5:
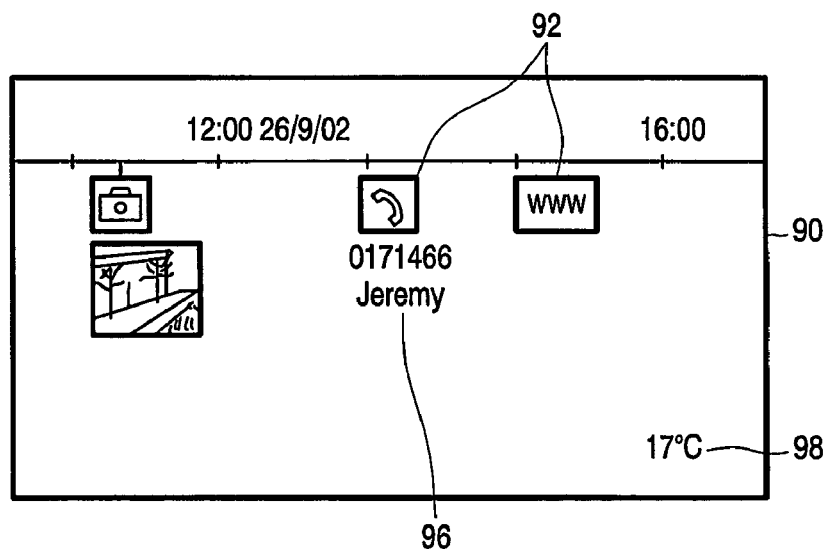
FIG. 5 illustrates a display in a time mode.

Suppose a user is looking at a photograph taken some time ago. By switching to the time view a broad timeline (FIG. 5; 90) displays information about the time around the time the picture was taken. Operation of the zoom control allows the display to be adjusted to a ten minute time interval around the moment the picture was taken. Icons 92 for web browsing and making a phone call a few minutes after taking the photo are displayed, so the user can zoom in to see details 96 of the phone call and web sites accessed.

All this time other information 98 is displayed in the background, for example whether the time is day or night, temperature, etc.

By switching view to access the web page the web page is displayed together with a border which can be selected to return to the time line display.

Figure 6:
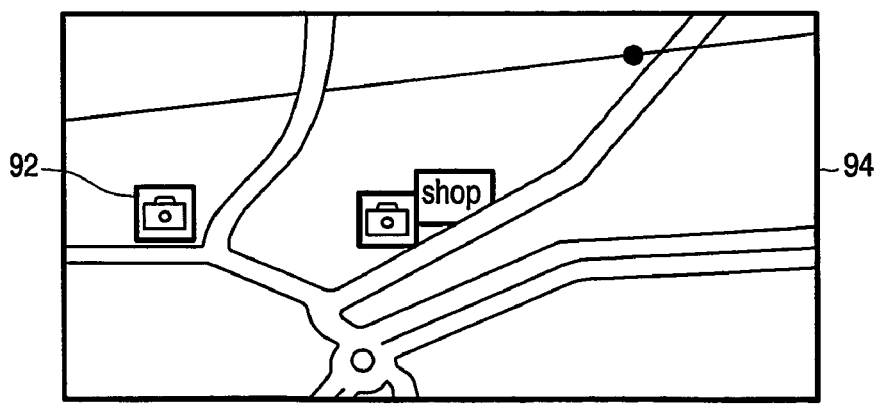
FIG. 6 illustrates a display in a space mode.

Continuing with the example, the web page describes a shop. Since the web page has a tag specifying time and position, the tag allows switching to a space view 94, FIG. 6 to display a map showing the exact location of the shop. The space view also displays a number of photographs, one of which was the photograph with which the example started. Again, the display can be zoomed in or out using the zoom control to allow the display of a greater or narrower area around the shop.

The user can continue browsing to find what happened and to find further information. Thus the invention provides a personal digital assistant that acts in many ways as a personal diary, and allows a display, for example, of the movements of the user on a given day.

The invention is not limited to the PDA described above, but many variants are possible. The types of screen, memory, and other components can be varied as required.

It should be noted that in alternative embodiments the portable computer device can be distributed amongst a number of separate components. For example, the camera may be a separate camera in a separate housing arranged to communicate with a separate PDA component. The communications link may be permanently on or only on in certain circumstances, for example when the camera is brought into close proximity with the PDA. The communication between the components may be wired or wireless, for example using a personal area network (PAN) interface.

The clock unit may be a physical clock or some other means for determining time information, for example by reading time information received on the wireless interface.

From reading the present disclosure, other variations and modifications will be apparent to persons skilled in the art. Such variations and modifications may involve equivalent and other features which are already known in the design, manufacture and use of portable computer devices and which may be used in addition to or instead of features described herein.

The invention claimed is:

1. A portable computer device comprising:
a data input (26, 38);
a control input (16);
data acceptance logic (24,40) arranged to accept data on the data input (26, 38), to determine whether time and location information is present, to add time and/or location information to data items not having time and/or location information respectively and to store data items in memory (22) together with respective time and location information; and a display arrangement (6,24,40) arranged to cause the display of data items, including data items stored in the memory (22), in one of a plurality of modes, the modes including a time mode and a space mode, the display arrangement being arranged:
to switch (54) between the time and space modes in response to a corresponding input on the control input (16);

to display in the time mode a representation (90) of a time interval together with representations (92) of those data items that have respective time information in the time interval, the representations of data items being displayed at locations corresponding to the respective time information; and to display in the space mode a representation of a display area (94) together with representations (92) of those data items that have respective location information within the display area, the representations of data items being displayed at locations corresponding to the respective location information;

a zoom control (14), wherein the computer device accepts input from the zoom control (14) and adjusts the zoom setting of the display to adjust the displayed time interval in the time mode and the display area in the space mode in accordance with the input on the zoom control (14) and wherein in the time mode adjusting the zoom setting enables a broad view the representations (92) to details of a single representation (92).

2. A computer device according to claim 1 wherein the data items (92) are displayed together with information (96) relating to the data items, the amount of information displayed for each data item varying with the zoom setting set by the zoom control.

3. A portable computer device according to any preceding claim further comprising:
   a location determining arrangement (28) for obtaining location information; and
   a clock unit (32) for determining time information, wherein the display arrangement includes a screen (6) for displaying information; and
   the data input includes data exchange circuitry (26, 38) including a wireless interface for bi-directional communication.

4. A portable computer device according to claim 1 further comprising a control (18) for selecting data items wherein on switching between time and location modes the selected data item remains displayed.

5. A portable computer device according claim 1 wherein the display of data items includes displaying icons (92) corresponding to the data items.

6. A computer device according to claim 1 wherein the data acceptance logic associates a tag (45) of predetermined format with each data item, the tag including the location, the time and the type of the corresponding data item.

7. A computer device according to claim 1 further comprising a scroll control (12) for scrolling the time mode and space mode displays.

8. A computer device according to claim 1 further comprising a camera (30) to record images.

9. A method of operation of a computer device, the method including:
   accepting (70) input data;
      testing (72) whether input data includes time information and determining (74) the time of any input data not including time information;
      testing (76) whether input data includes location information and determining (76) the computer device location as the location of any input data not including location information;
   recording (80) input data as data items including both time information and location information;
   accepting an input to select a time or a space mode;
      in the time mode, displaying on a display screen representations (92) of data items in a time interval on a time line according to the time information stored in the memory corresponding to the data items;
      in the space mode, displaying on the display screen representations (92) of data items on a displayed area according to the location information corresponding to the data items; and
      zooming the display to change the display area in the space mode and to change the time interval in the time mode) and wherein in the time mode adjusting the zoom setting enables a broad view the representations (92) to details of a single representation (92).

10. A method according to claim 9 further including recording an image corresponding to a new event, storing the image as a data item (44) together with the time and location information and displaying the image when displaying the data item.

11. A computer program product (40) arranged to cause a computer to carry out the steps of a method according to claim 9.

12. A computer program product (40) according to claim 11 recorded on a data carrier (22).

\* \* \* \* \*